W. M. CAHILL.
ANIMAL SHEARS.
APPLICATION FILED SEPT. 5, 1908.
926,726.
Patented July 6, 1909.
2 SHEETS—SHEET 1.
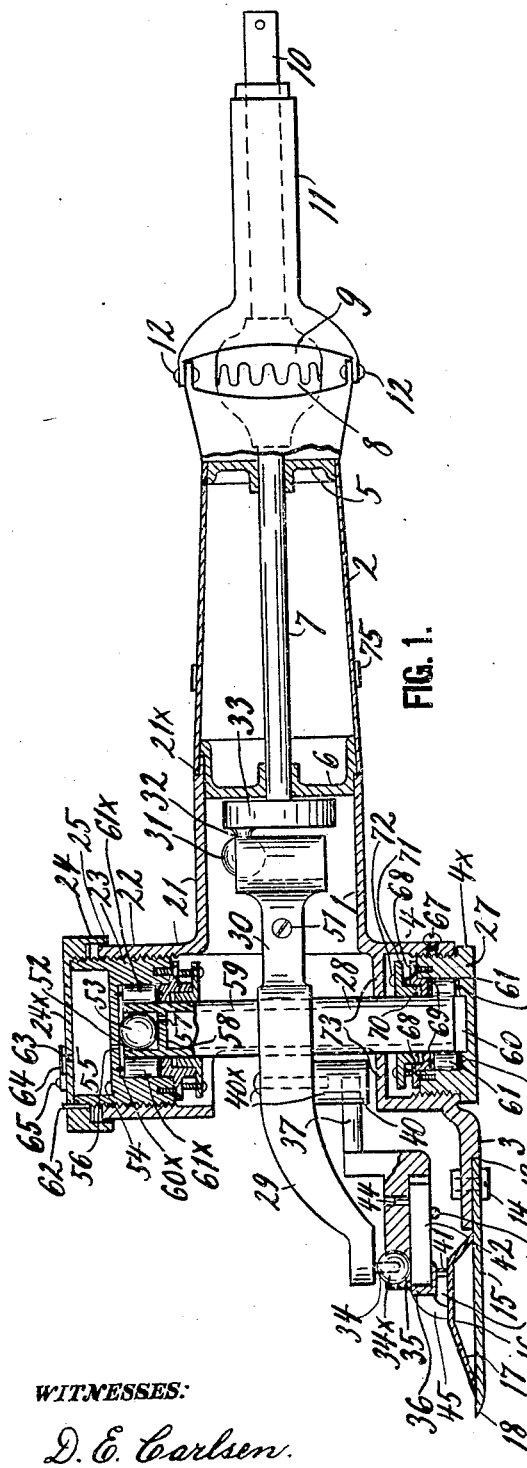
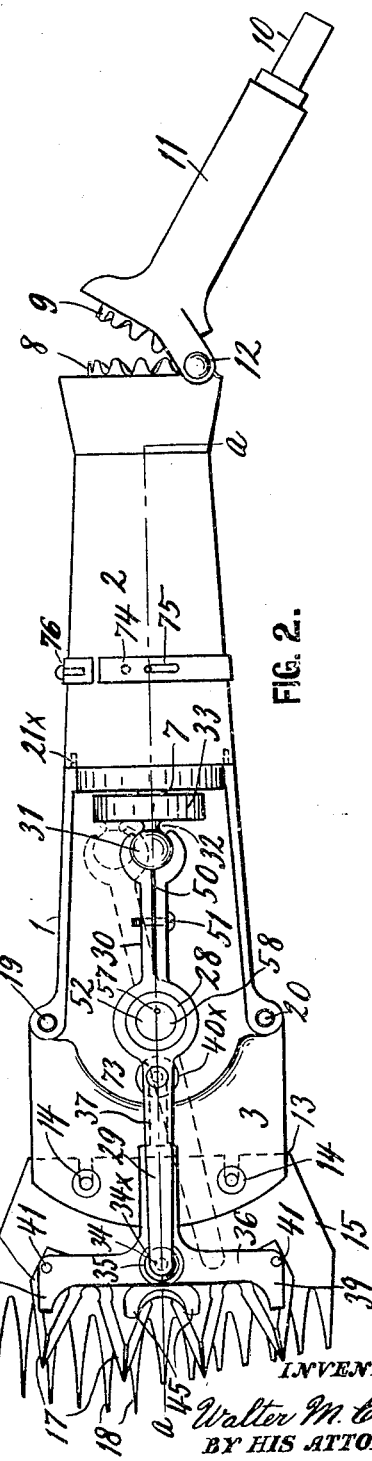
WITNESSES:
D. E. Carlsen.
E. C. Carlsen.
INVENTOR:
Walter M. Cahill.
BY HIS ATTORNEY:
A. M. Carlsen.

W. M. CAHILL.
ANIMAL SHEARS.
APPLICATION FILED SEPT. 5, 1908.

926,726.

Patented July 6, 1909.
2 SHEETS—SHEET 2.

WITNESSES:
D. E. Carlsen
E. C. Carlsen

INVENTOR.
Walter M. Cahill
BY HIS ATTORNEY:
A. M. Carlsen

UNITED STATES PATENT OFFICE.

WALTER M. CAHILL, OF WINONA, MINNESOTA.

ANIMAL-SHEARS.

No. 926,726.　　　Specification of Letters Patent.　　　Patented July 6, 1909.

Application filed September 5, 1908. Serial No. 451,895.

*To all whom it may concern:*

Be it known that I, WALTER M. CAHILL, a citizen of the United States, residing at Winona, in the county of Winona and State of Minnesota, have invented a new and useful Animal-Shears, of which the following is a specification.

This invention relates to animal shears and more especially to the class of such shears known as clippers and used for shearing sheep.

It is a further improvement on the shears covered by my United States Patent No. 888,867, issued on May 26, 1908.

The object is to further improve the wearing parts and also provide further means for oiling the same, as will be fully pointed out in the below description and claims; reference being had to the accompanying drawings, in which:—

Figure 3:
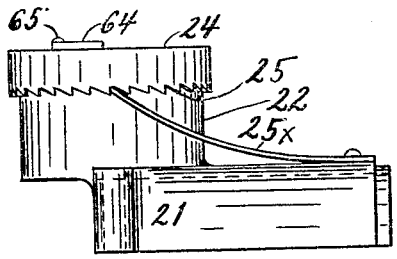
Figure 4:
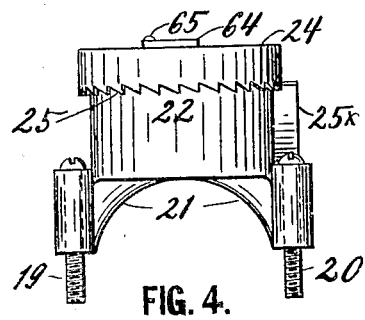
Figure 5:
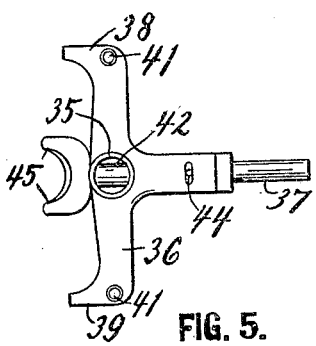
Figure 6:
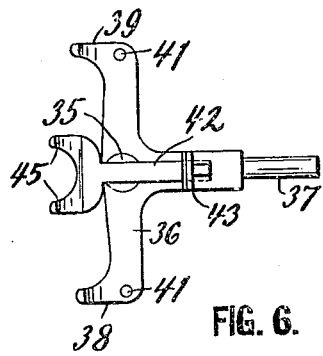

Figure 1 is a sectional side view of an animal shear embodying my invention, as on the line $a$—$a$ in Fig. 2. Fig. 2 is a top view of the device with the cap or covering of the mechanism removed. Fig. 3 is a side elevation of the cap removed from Fig. 2. Fig. 4 is a front end view of Fig. 3. Fig. 5 is a top view and Fig. 6 a bottom view of the cutter-actuator.

Referring to the drawing by reference numerals, the body of the implement comprises a shell 1 with a rearwardly extending cylindrical, preferably sheet metallic handle 2, and a forwardly projecting plate 3, which is offset at 4 to leave ample space between the handle and the body of the animal for the fingers of the hand holding the handle.

In the end walls 5—6 of the handle is journaled a shaft 7 driven by meshing miter gears 8—9, the latter of which is fixed on a shaft 10 adapted to be driven by any suitable power; said shaft is journaled in a sleeve 11, pivotally connected to the handle at 12 tangent to the pitch line of the gears, as is common in such devices.

In a recess 13 at the lower side of plate 3 is secured by screws 14 the comb-plate 15, upon which oscillates the cutter plate 16, whose cutting blades 17 coact with the edges of the teeth 18 of the comb-plate in cutting the wool. The means by which the cutter plate is oscillated and always kept in close contact with the comb will now be described.

Upon the shell or chamber 1 is held by screws 19 and 20 a cover 21, whose rear end is inserted at $21^\times$ into the sheet metal handle 2. In the upper part 22 of said cover is screw-threaded a journal bearing 23 having an over-hanging circular flange 24 with serrations 25 engaging a spring arm $25^\times$ by which it is held in any adjusted position. In said bearing 23 and in a bearing 27 at the heel of plate 3 are journaled the ends of a vibrator shaft 28, on which is secured a two-armed vibrator 29—30, whose rear arm 30 has its end provided with a vertical channel which is engaged for oscillation by a crank stud 32 provided with a spherical roll 31 operating in the vertical channel and being secured in a crank 33 formed on the front end of the shaft 7.

The lower end of the vibrator shaft is always suspended from the bottom of the lower bearing so that any downward pressure at the upper end of the shaft, as may be regulated by the turning of the cap 24, is sustained by the arm 29, which near its end has a finger 34 with a spherical roll $34^\times$ on it engaging in a pit 35 of an actuator 36, having three arms, 37—38—39, of which, arm 37 rests in an opening 40 in a stud $40^\times$ in the front arm 29 of the vibrator, and arms 38—39 rest upon the end-blades of the cutter-plate 16, near which they have fixed pins 41 engaging holes in the cutter plate. The roll or ball 34 does not, however, rest directly upon any part of the actuator, as the pit of the latter has no bottom, but the bottom of the ball rests upon a pressure-equalizer or bar 42, which is inserted in a groove in the lower side of the actuator and rests with its rear end pivotally upon a bridge bar 43 of the actuator and is retained in the groove by a pin 44, while its front end is formed with two downwardly curved fingers 45 bearing upon the middle blades of the cutter plate, so that the pressure of the arm 29 is equalized upon the the middle of each of the blades of the cutter plate, which is very important as the plate is very apt to become ground or worn lower at one end than at the other, and its segmental shape has a tendency to let the wool raise the middle blades upward unless the downward pressure is thus equalized. It will also be observed that the ball 34 moves in a plane parallel to the comb by means of the vertical vibrator shaft, in contradistinction to other means formerly used and which very soon gets out of order.

The present improvements over my said former patent will now be fully described.

The ball 34× is loose on the stud 34, so that the stud may be unhardened and thus not liable to break by being hardened together with the ball, while the ball may be hardened to the highest degree and thus last longer; the ball has a bottom for the stud to press upon.

The rear end of the vibrator arm 30 is split at 50 into two arms which by a screw 51 are sprung together in taking up wear of the roller 31 in the channel of said arm. The rear end of the actuator 37 is offset upwardly so as to bring its point of contact in the socket 40 as high up as possible and thereby lessen the tendency the ball 34× has to rock the actuator. The stud 40× is removably secured in the arm 29 so that when its socket 40 wears large the stud may be removed and replaced by a new one.

The upper end of the vibrator shaft is formed with a pocket 52 in which rests a ball 53 which projects slightly above the end of the shaft and receives downward pressure from the bottom 54 of the cap 23. Above said bottom is provided a large chamber 55 for lubricating oil, which flows down through an oil hole 56 in the said bottom and through an oil hole 57 in the bottom 58 of the pocket 52. Below the latter bottom the vibrator shaft is hollow inside, forming another oil reservoir 59, which communicates with the space 60 below the lower end of the shaft. From the latter space the oil is distributed to roller bearing 61 in which the lower end of the shaft rocks; and from the space 60× above the shaft oil is distributed to similar roller bearings 61× about the upper end of the shaft.

The oil chamber 55 is closed by the screw-cap 24× which is held against accidental rotation by a screw 62, and is provided with a filling hole 63, closed by a lid 64 swinging on a pivot 65.

The rollers 61 of the roller bearings are preferably so small in diameter that they will each make a full turn for each rocking movement of the shaft, and thus prevent the rollers from wearing flat. The rollers 61 have their lower ends journaled in a circular groove 66 in the bottom bearing 27, which is screw-threaded upwardly into the base 4, is retained by a set-screw 67, and has in its upper end held by screws 68 a ring 69, with a packing groove 70 about the shaft and at the lower side a groove for the upper ends of the rollers. In said packing groove fits a stuffing box 71 held to the ring and against the packing (not shown) by adjustment screws 72. The roller bearings, ring and stuffing box about the upper end of the shaft, although inverted are so similar to those at the lower end just described that said description will answer for both.

In Fig. 1 is shown how the cavity in the lower part of the frame is covered against dirt and wool by a fixed bottom 73 through which the vibrator shaft passes snugly. The handle portion 2 is formed of sheet metal and secured upon the end portions 5 and 6, of which the latter may be cast integral with the frame or shell 2. The sheet metal handle forms an excellent oil holder for lubricating the shaft 7. It is filled through an aperture 74, which is closed by an open clasping ring 75, having slots guided on pins or screws 76 secured in the handle. By turning the ring some one of the slots will register with the aperture and permit the oil to be poured in.

What I claim is:—

1. In animal shears and mounted in a suitable frame, the combination of a driven crank shaft, a vibrator shaft adjacent thereto, a two-armed vibrator fixed on the shaft and having one end provided with a channel adapted for engagement with the crank, the other arm having near the shaft a removable depending stud with a pocket in its front side, and near its end a depending finger, a bottomed spherical roller on said stud, an actuator lever having a cavity for said roll to engage, said actuator having an upwardly and rearwardly extended arm engaged by the pocket of the removable stud, it also having forwardly and downwardly extending arms, and a shear blade engaged and operated by the latter arms.

2. In animal shears of the kind described and mounted in a suitable frame, the combination of a movable shear blade, a vertically disposed vibrator shaft having one arm operatively connected with the blade and another arm adapted to receive motion from a crank, roller bearings about the ends of said agitator shaft, chambers for lubricating oil to both ends of the shaft and communicating with the roller bearings and with each other through holes and ducts inside the shaft, and stuffing boxes adjacent thereto on the shaft to prevent escape of the oil.

3. In animal shears of the kind described and mounted in a suitable frame, the combination of a movable shear blade, a vertically disposed vibrator shaft having one arm operatively connected with the blade and another arm adapted to receive motion from a crank, roller bearings about the ends of said agitator shaft, chambers for lubricating oil adjacent to both ends of the shaft and communicating with the roller bearings and with each other through holes and ducts inside the shaft, stuffing boxes adjacent thereto on the shaft to prevent escape of the oil and the entrance of dirt, the upper oil chamber being larger than the lower one and provided with an inlet aperture and means for closing the same when it is not in use.

4. In animal shears of the kind described and mounted in a suitable frame, a fixed shearing blade, an oscillating shear blade co-acting therewith, a vertically disposed downwardly movable vibrator shaft having an arm pressing upon and also operatively connected with the oscillating blade, said shaft having in its upper end a central pocket with oil holes through its bottom some distance beyond the center, a ball in the pocket, a downwardly adjustable cap pressing upon the ball and means for holding the cap against accidental turning, and an oil chamber within the shaft communicating with said oil holes and with the bottom end of the shaft.

5. In animal shears of the kind described, a hollow handle closed at both ends thereby adapting said handle to serve as a lubricator, an operating shaft journaled in the ends thereof and extending there-through, an aperture in one side of the handle, a clasping band guided to turn on the handle and having an aperture adapted to register with the aperture in the handle while said handle is being filled substantially as shown and described.

6. In animal shears of the kind described, a hollow handle closed at both ends thereby adapting said handle to serve as a lubricator, an operating shaft journaled in the ends thereof and extending there-through, an aperture in one side of the handle, a clasping band guided to turn on the handle and having an aperture adapted to register with the aperture in the handle while said handle is being filled; the body of said hollow handle being formed of sheet metal substantially as shown and described.

In testimony whereof I affix my signature, in presence of two witnesses.

WALTER M. CAHILL.

Witnesses:
A. M. CARLSEN,
HAROLD HARRIS.